(12) United States Patent
Detwiler

(10) Patent No.: US 7,611,055 B1
(45) Date of Patent: Nov. 3, 2009

(54) OPTICAL SCANNER

(75) Inventor: Paul O. Detwiler, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/550,516

(22) Filed: Oct. 18, 2006

(51) Int. Cl.
*G02B 26/00* (2006.01)

(52) U.S. Cl. ............... 235/440; 235/46.17; 235/462.43

(58) Field of Classification Search ............ 235/462.14, 235/462.07, 462.15, 462.35, 462.08, 462.17, 235/462.01–2, 462.31–32, 462.38–40, 462.43, 235/454; 359/204, 226; 902/22
See application file for complete search history.

(56) References Cited

U.S. PATENT DOCUMENTS

| | | | | |
|---|---|---|---|---|
| 4,868,375 A | * | 9/1989 | Blanford ................ | 235/462.15 |
| 5,361,158 A | * | 11/1994 | Tang ...................... | 235/462.4 |
| 5,459,308 A | * | 10/1995 | Detwiler et al. .......... | 235/383 |
| 5,786,582 A | * | 7/1998 | Roustaei et al. ......... | 235/462.07 |
| 5,801,370 A | * | 9/1998 | Katoh et al. ............ | 235/462.01 |
| 6,502,749 B1 | * | 1/2003 | Snyder .................... | 235/383 |
| 7,195,167 B2 | * | 3/2007 | Lucera et al. ............ | 235/462.4 |
| 7,206,012 B2 | * | 4/2007 | Cook et al. .............. | 347/234 |

\* cited by examiner

*Primary Examiner*—Daniel St.Cyr
(74) *Attorney, Agent, or Firm*—Paul W. Martin; Harden E. Stevens, III

(57) ABSTRACT

An optical scanner which is configurable to produce a single pattern or a plurality of patterns. The scanner includes an optics engine with first and second laser mounts, first and second detector mounts, a first laser in the first laser mount for producing a first scanning light beam, a mirrored spinner for directing the first scanning light beam, and a first detector in the first detector mount for converting first light reflected from an item with a barcode label into first electrical signals. The scanner further includes pattern mirrors for receiving the first scanning light beam from the mirrored spinner, for producing a first scan pattern from the first scanning light beam for scanning the item, and for directing the first light reflected from the item to the mirrored spinner, and control circuitry for controlling operation of the first laser and the mirrored spinner.

8 Claims, 10 Drawing Sheets

OPTICAL SCANNER

BACKGROUND

It is desirable to have a barcode scanner that will read a label on any one of six main orthogonal surfaces of a rectangular package oriented at right angles to the scanner, as well as the various intermediate surfaces between those orthogonal ones. This would provide true omni-directionality in scan coverage.

It is further desirable to have such a scanner that is compact enough to enable it to be integrated with items such as produce scales, electronic security devices and RFID label readers in a form factor suitable to the retail environment.

Finally, it is desirable to have a bar code scanner that can produce either a single pattern or two simultaneous overlapping patterns.

SUMMARY

In accordance with the present invention, an optical scanner is provided.

DETAILED DESCRIPTION

Figure 1:
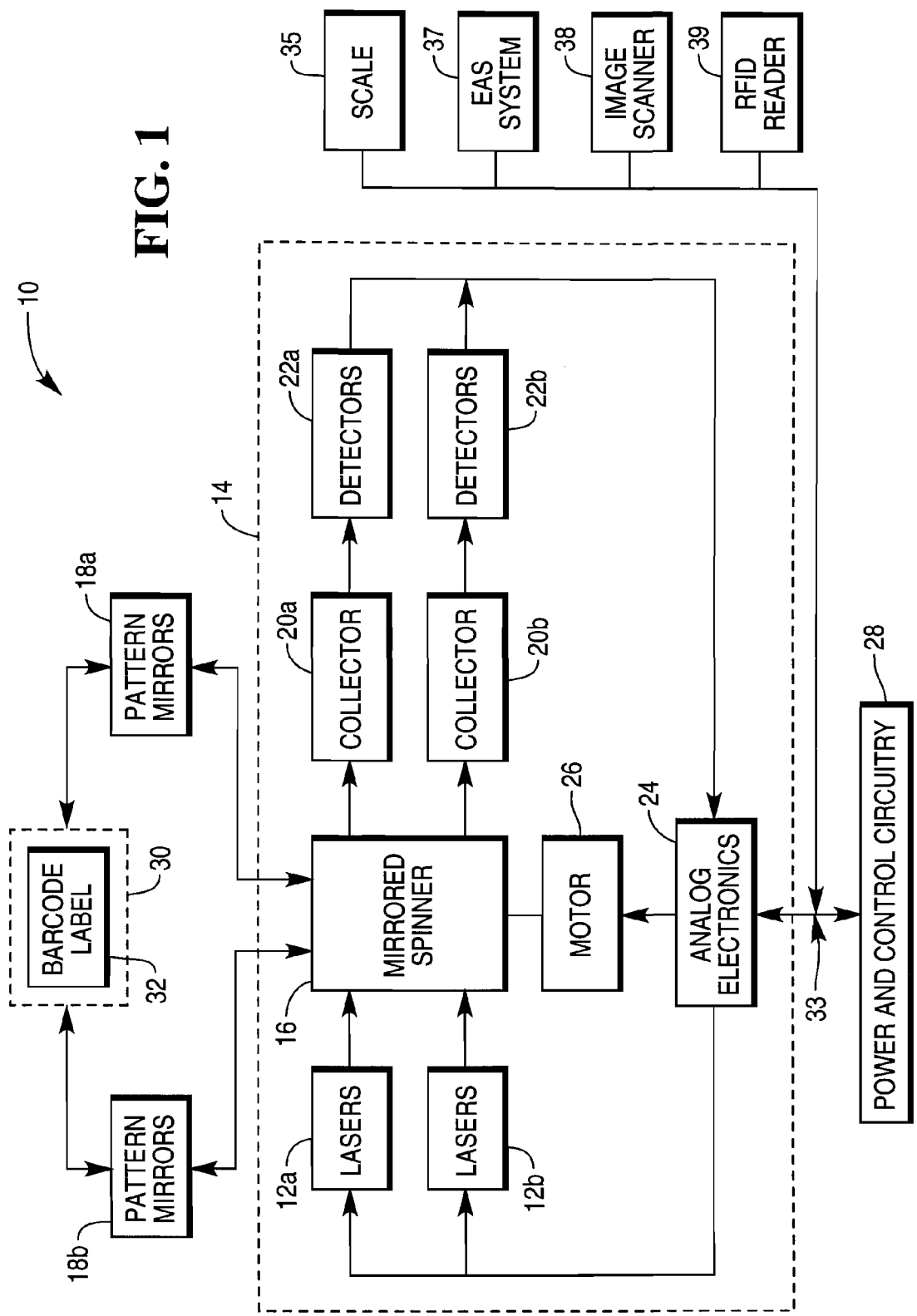
FIG. 1 is a block diagram of an optical scanner.
Figure 2:
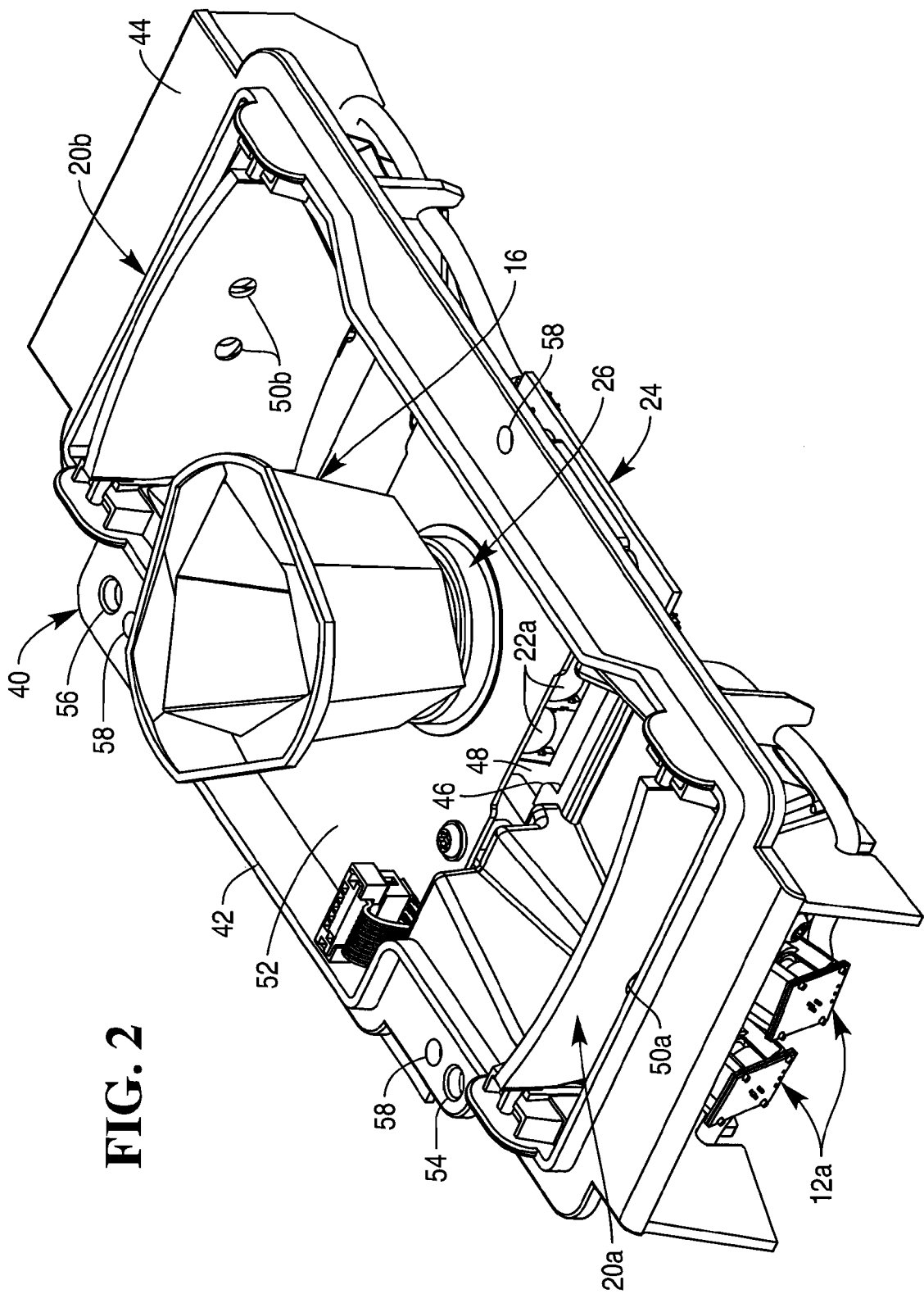
FIG. 2 is a perspective view of the optics engine.
Figure 3:
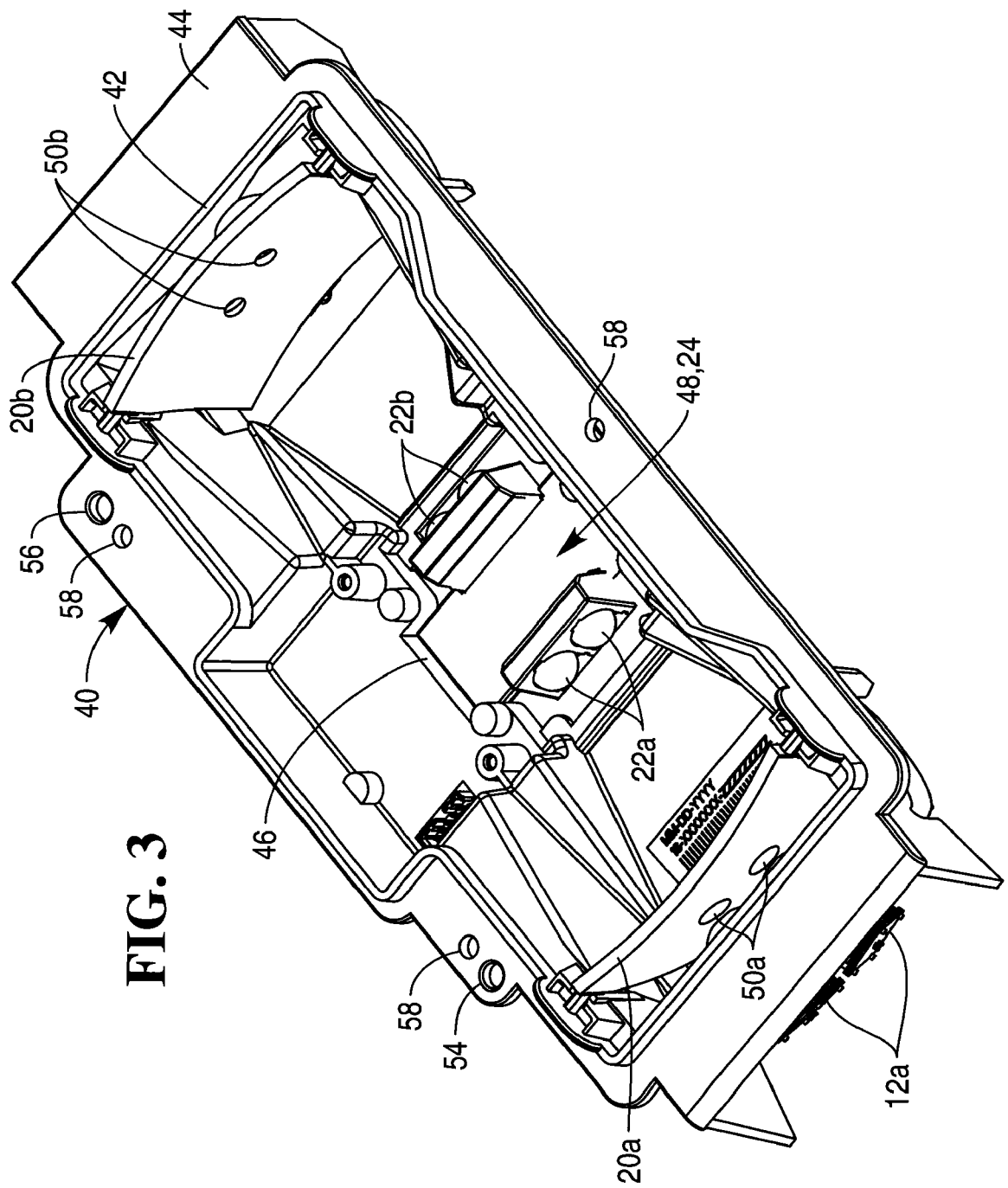
FIG. 3 is a perspective view of the optics engine with the spinner removed.

With reference to FIG. 1, an example embodiment of optical scanner 10 includes optics engine 14, pattern mirrors 18a and 18b, and power and control circuitry 28. Optical scanner 10 includes a dual aperture scanner.

Optical scanner 10 may additionally include scale 35, electronic article surveillance system 37, image scanner 38, and radio frequency identification (RFID) reader 39.

Optics engine 14 includes lasers 12a and 12b, mirrored spinner 16, collectors 20a and 20b, detectors 22a and 22b, analog electronics 24, and motor 26.

Laser 12a and 12b produce laser beams. Each of lasers 12a and 12b include one or more lasers. In the example embodiment, each of lasers 12a and 12b may include up to two lasers.

Mirrored spinner 16 directs the laser beams to pattern mirrors 18a and 18b to produce a scan pattern, and receives reflected light from item 30 from pattern mirrors 18. Motor 26 rotates mirrored spinner 16.

Collectors 20a and 20b collect the reflected light from mirrored spinner 16 and direct it towards detectors 22a and 22b.

Detectors 22a and 22b convert the reflected light into electrical signals. In the example embodiment, each of detectors 22a and 22b may include up to two detectors.

Analog electronics 24 provides drive circuitry for lasers 12a and 12b and motor 26, and amplifies and filters the electrical signals from detectors 22a and 22b.

Pattern mirrors 18a direct the laser beams from laser 12a towards bar code label 32 and direct the reflected light to mirrored spinner 16. Pattern mirrors 18b direct the laser beams from laser 12b towards bar code label 32 and direct the reflected light to mirrored spinner 16.

Power and control circuitry 28 controls operation of scanner 10 and additionally processes the processed electrical signals from analog electronics 24 to obtain information encoded in bar code label 32. Power and control circuitry 28 may be connected to analog electronics 24 through one or more cables 33.

With reference to FIGS. 2-6, an example embodiment of optics engine 14 is illustrated in more detail.

In this example embodiment, optics engine 14 is for use in a dual-aperture scanner, although, optics engine 14 may alternatively be used in a single-aperture scanner. In fact, a single type of optics engine 14 may be used in different scanners having distinct pattern mirror arrangements.

Optics engine 14 includes housing 40, which supports mounting of laser 12, mirrored spinner 16, motor 26, collector 20, detector 22, and electronics 24.

In this example, housing 40 is generally rectangular in shape and can accommodate up to four lasers 12, two collectors 20, and four detectors 22. Lasers 12a, collector 20a, and detectors 22a are associated with a first aperture 34 (FIG. 6) of the dual-aperture scanner 10. Lasers 12b, collector 20b, and detectors 22b are associated with a second aperture 36 of the dual-aperture scanner. Thus, lasers 12a produce laser beams which pass through apertures 50a in collector 20a to directly strike mirrored spinner 16 from one side of housing 40 to produce scanning beams which strike a first set of pattern mirrors 18 in scanner housing 70 (FIG. 6) and result in a first set of scan lines 35 that emanate from the first aperture 34. Light reflected from item 30 returns through the first aperture and strikes collector 20a, which directs the reflected light towards detectors 22a.

Similarly, lasers 12b produce laser beams which pass through apertures 50b in collector 20b to directly strike mirrored spinner 16 from the other side of housing 40 to produce scanning beams which strike a second set of pattern mirrors 18, some within base 60 of scanner housing 70 and some within a tower 61 mounted to base 60 and result in a second set of scan lines 37 that emanate from the second aperture 36. Light reflected from item 30 returns through the second aperture and strikes collector 20b, which directs the reflected light towards detectors 22b.

Housing 40 includes well section 42 and frame 44. Well section 42 contains a recess with a centrally located aperture 46 at the bottom. Lasers 12a and 12b extend through apertures in opposite ends of well section 42. Collectors 20a and 20b are mounted at the opposite ends with apertures 50a and 50b adjacent to their respective lasers 12a and 12b. A first printed circuit board 48 (FIG. 3) containing detectors 22a and 22b and electronics 24 fastens over aperture from below, with detectors 22a and 22b extending upwardly into well section 42. A second printed circuit board 52 (FIG. 2) containing motor 26 fastens to well section 42 above first printed circuit board 48. Mirrored spinner 16 mounts to motor 26 in the center of well section 42.

Figure 4:
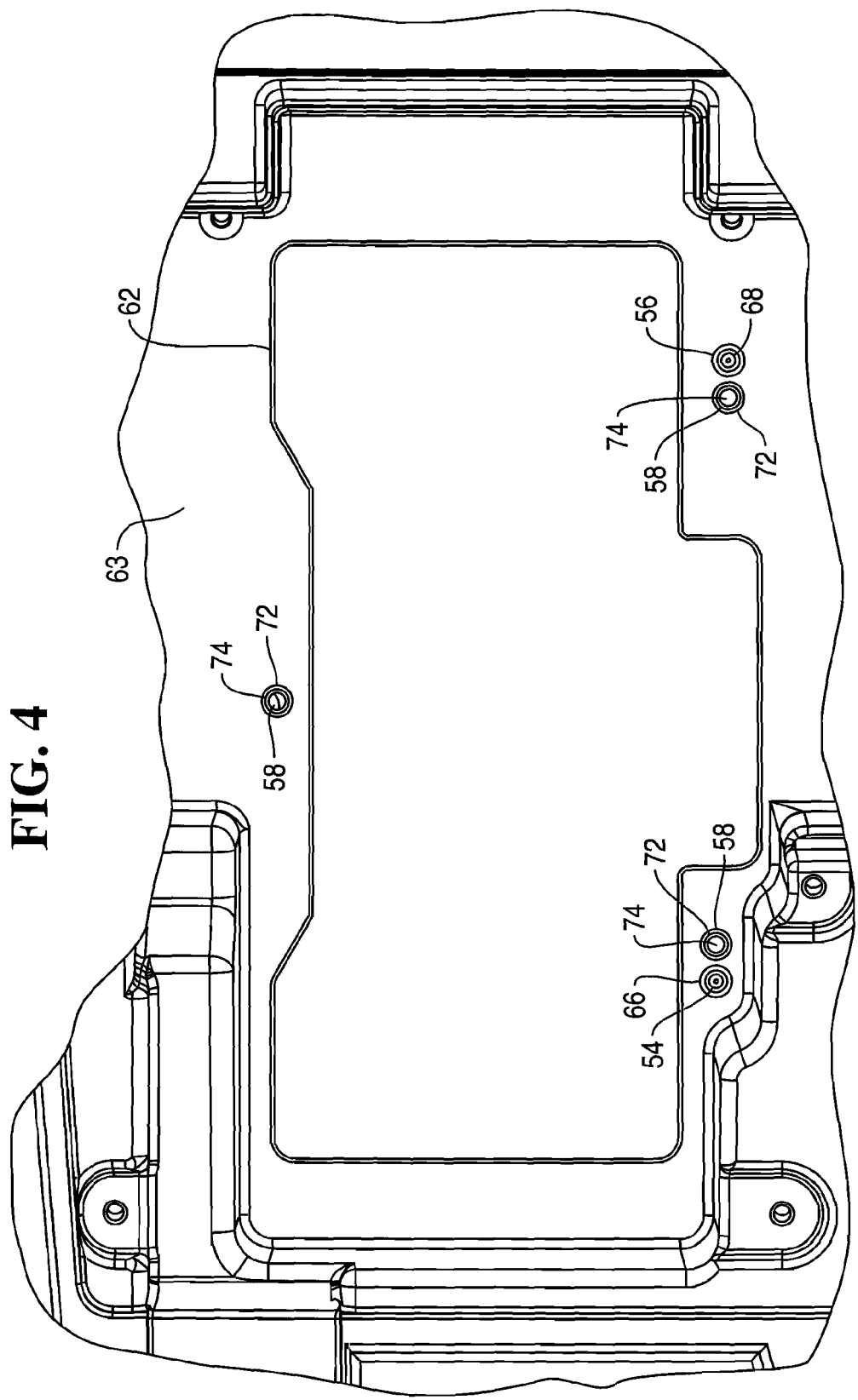
FIG. 4 is a bottom view of scanner housing.
Figure 5:
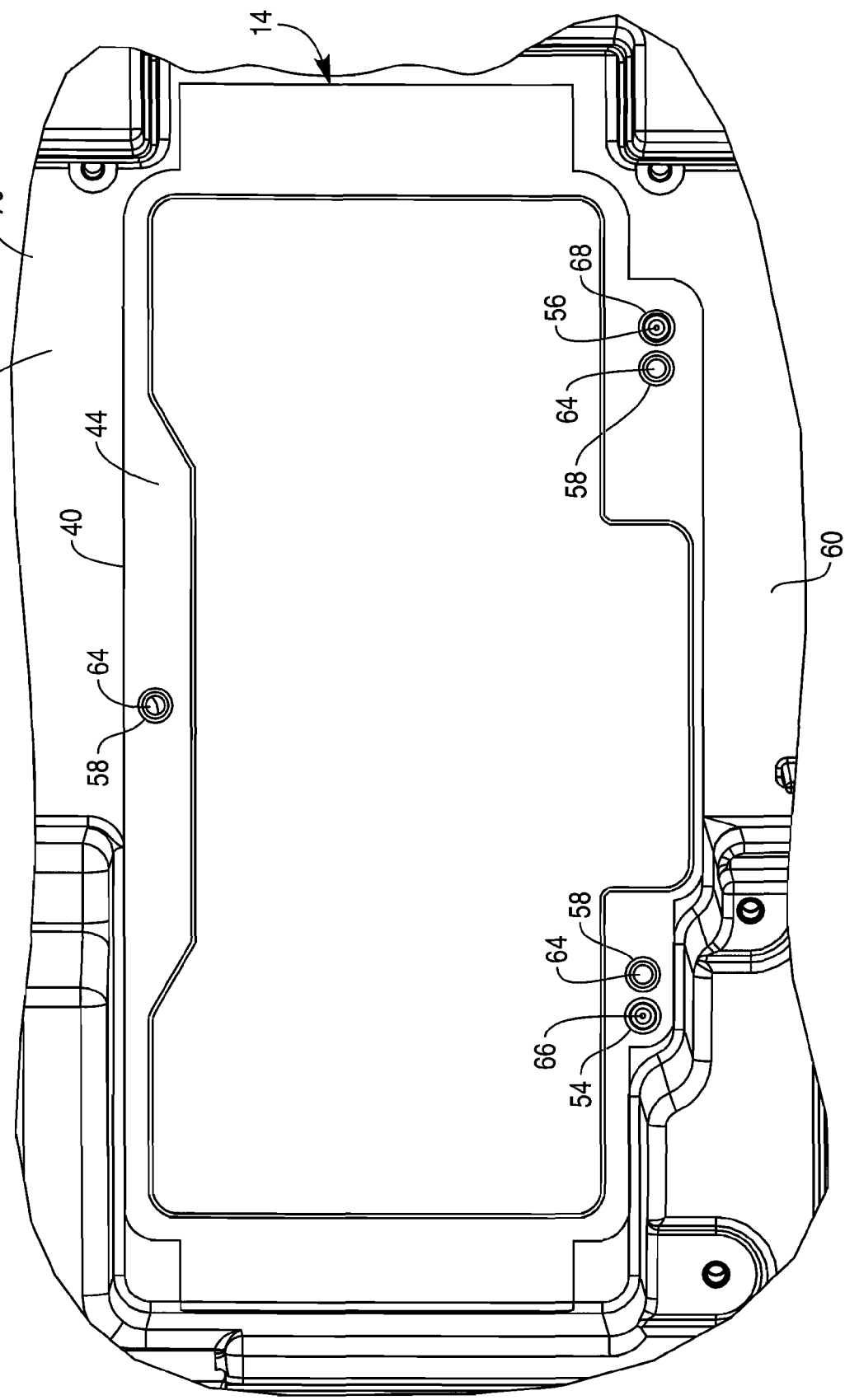
FIG. 5 is a bottom view of the scanner showing mounting features of the optics engine.
Figure 6:
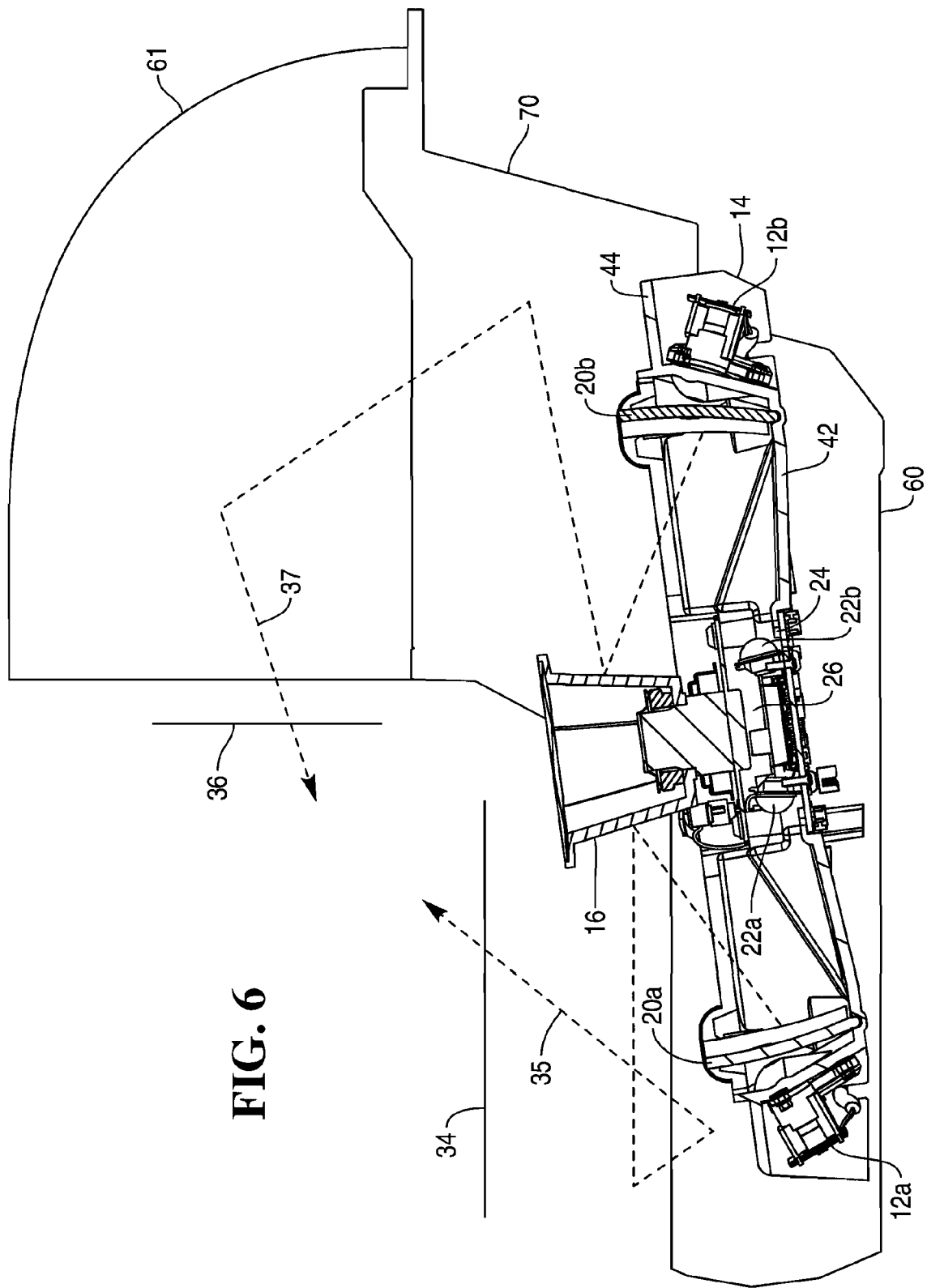
FIG. 6 is a cross-section of the scanner illustrating placement of the optics engine.

With reference to FIGS. 4-6, frame 44 surrounds well section 42. Frame 44 includes mounting holes 54, 56, and 58 for aligning and fastening housing 40 to bottom surface 63 of scanner 10.

Optics engine 14 mounts within aperture 62 in bottom surface 63 of scanner housing 70. Aperture 62 is roughly the same shape as the perimeter of well section 42.

Bottom surface 63 of scanner housing 70 includes aligning pads 72 and aligning pins 66 and 68. Aligning pads 72 establish a planar reference for installing optics engine 14. By approximating three point contacts, aligning pads 72 minimize rocking of housing 40.

Aligning pin 66 establishes an origin of rotation.

Aligning pin 68 establishes a point of rotation about the origin.

Bottom surface 63 also includes screw holes 74 for receiving screws 64 through holes 58 in housing 40. Screws 64 fasten optics engine 14 to housing 70.

To locate a solid part like housing 40 takes up to six constraints. Pressing housing 40 onto aligning pads 72 provides three constraints for limiting motion in a first direction. Inserting aligning pin 66 into corresponding hole 54 provides fourth and fifth constraints for limiting motion in second and third directions. Aligning pin 66 is inserted into hole 54 with only a small clearance. Inserting aligning pin 68 into hole 56 provides a sixth constraint for limiting motion in the third direction. Hole 54 may be round and hole 56 may be slotted.

There is very little clearance orthogonal to a line between aligning pins 66 and 68, but more parallel to this line. This allows the parts to mate even if the pin to pin and hole to hole distances don't quite match.

Optics engine 14 may be easily replaced with another optics engine 14. The replacement optics engine 14 is aligned in a similar fashion, simplifying scanner repairs and avoiding costly optics aligning procedures.

Figure 7:
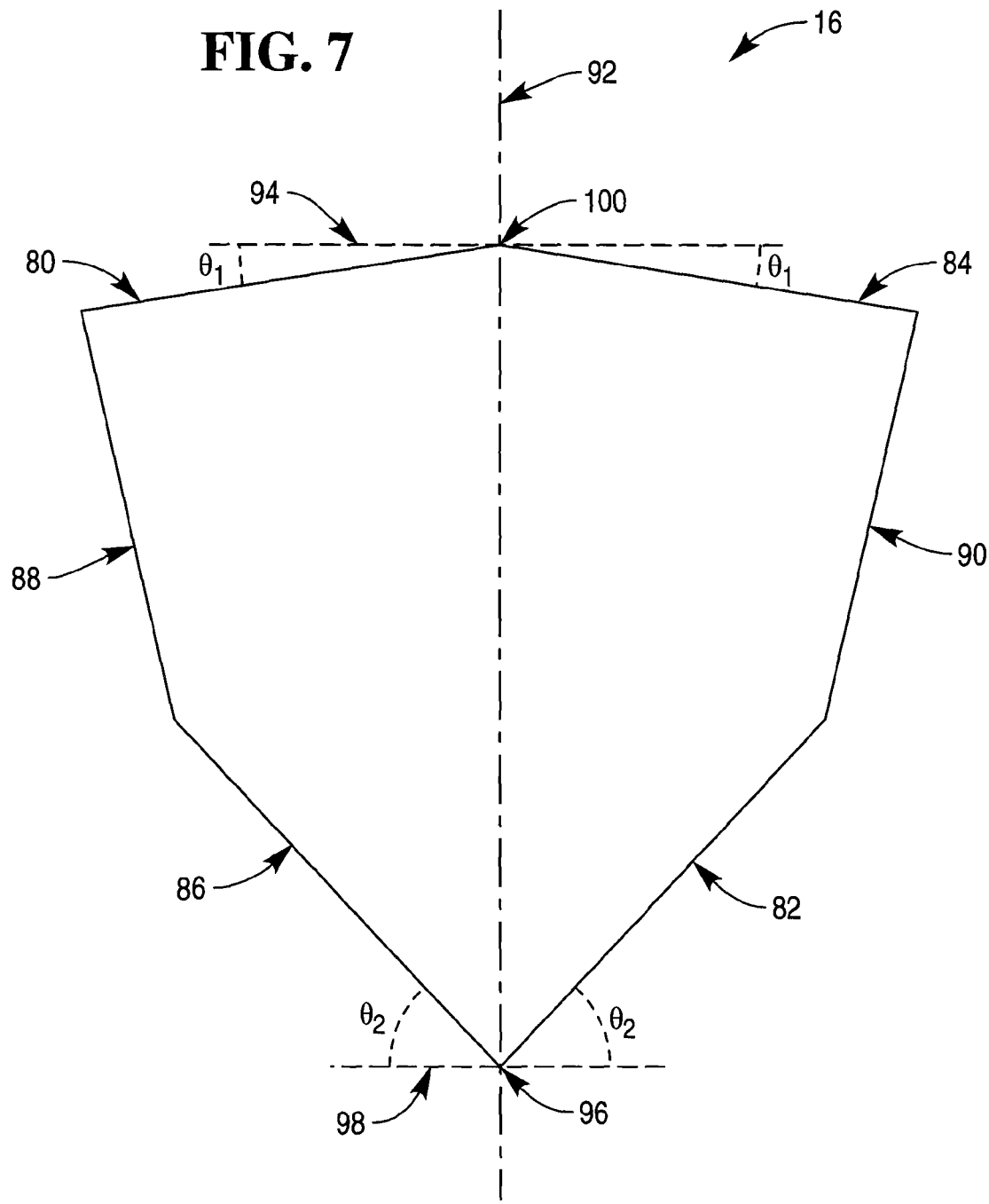
FIG. 7 is a schematic of an example mirrored spinner with paired offset facets.

With reference to FIG. 7, an example mirrored spinner 16 is illustrated in detail. Example mirrored spinner 16 includes six mirrored facets 80-90. Four or more mirrored facets are envisioned.

Example mirrored spinner 16 includes six facets 80-90. The angles between spinner facets one thru six and the spinner axis are 6.0, 9.0, 7.2, 6.6, 8.4, and 7.8 degrees respectively.

Example mirrored spinner 16 includes two pairs of offset mirrored facets, 80 and 82, and 84 and 86. The offset nature of the facets in this example is defined relative to a polygon spinner with six equal sides. Facets 80 and 84 are oriented at a vertex angle $\theta_1$ from a line 94 through vertex 100 and normal to centerline 92. Facets 82 and 86 are oriented at vertex angle $\theta_2$ from a line 98 through vertex 96 and normal to centerline 92.

Any method of determining offset that produces different vertex angles $\theta_1$ and $\theta_2$ is envisioned. One example way of determining offset is to define an offset angle $\Delta$, and subtract it from one pair of facet angles and add it to another pair of facet angles.

For example, in a polygon spinner with six equal sides, all six sides have the same vertex angle of 30°. Vertex angle $\theta_1$ equals 30°−Δ, and vertex angle $\theta_2$ equals 30°+Δ. In the illustrated example, offset angle Δ is about 15°. Therefore, vertex angle $\theta_1$ is about 15°, and vertex angle $\theta_2$ is about 45°.

Facets 88 and 90 link the pairs of offset facets together. Facet 88 links facet 80 to facet 86. Facet 90 links facet 84 to facet 82.

Relative to scanning beams produced by a conventional mirrored spinner with substantially equal facet angles, mirrored spinner 16 produces scanning beams that are each shortened on one end and extended on an opposite end.

Figure 8:
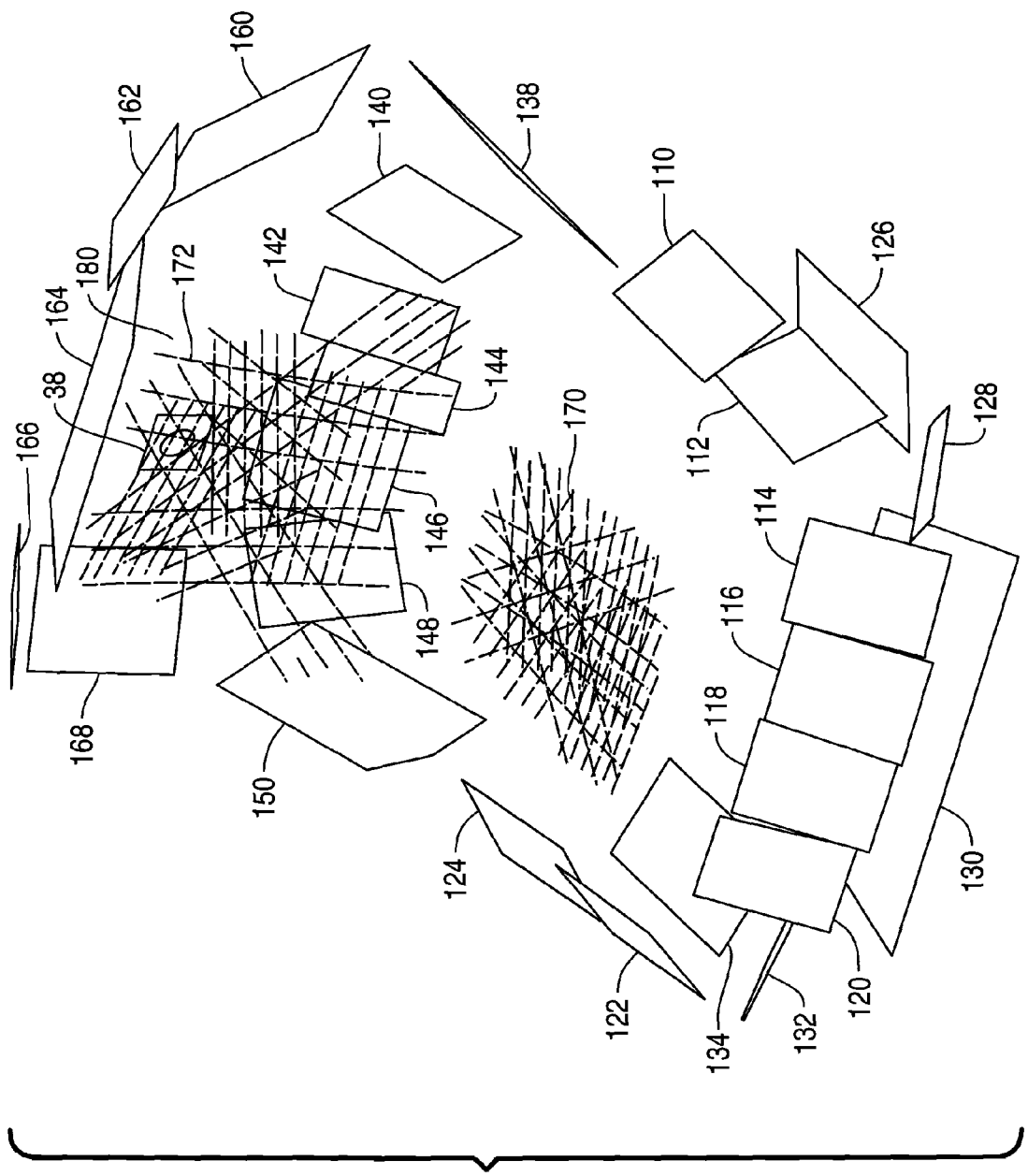
FIG. 8 illustrates mirrors and scan single scan pattern.
Figure 9:
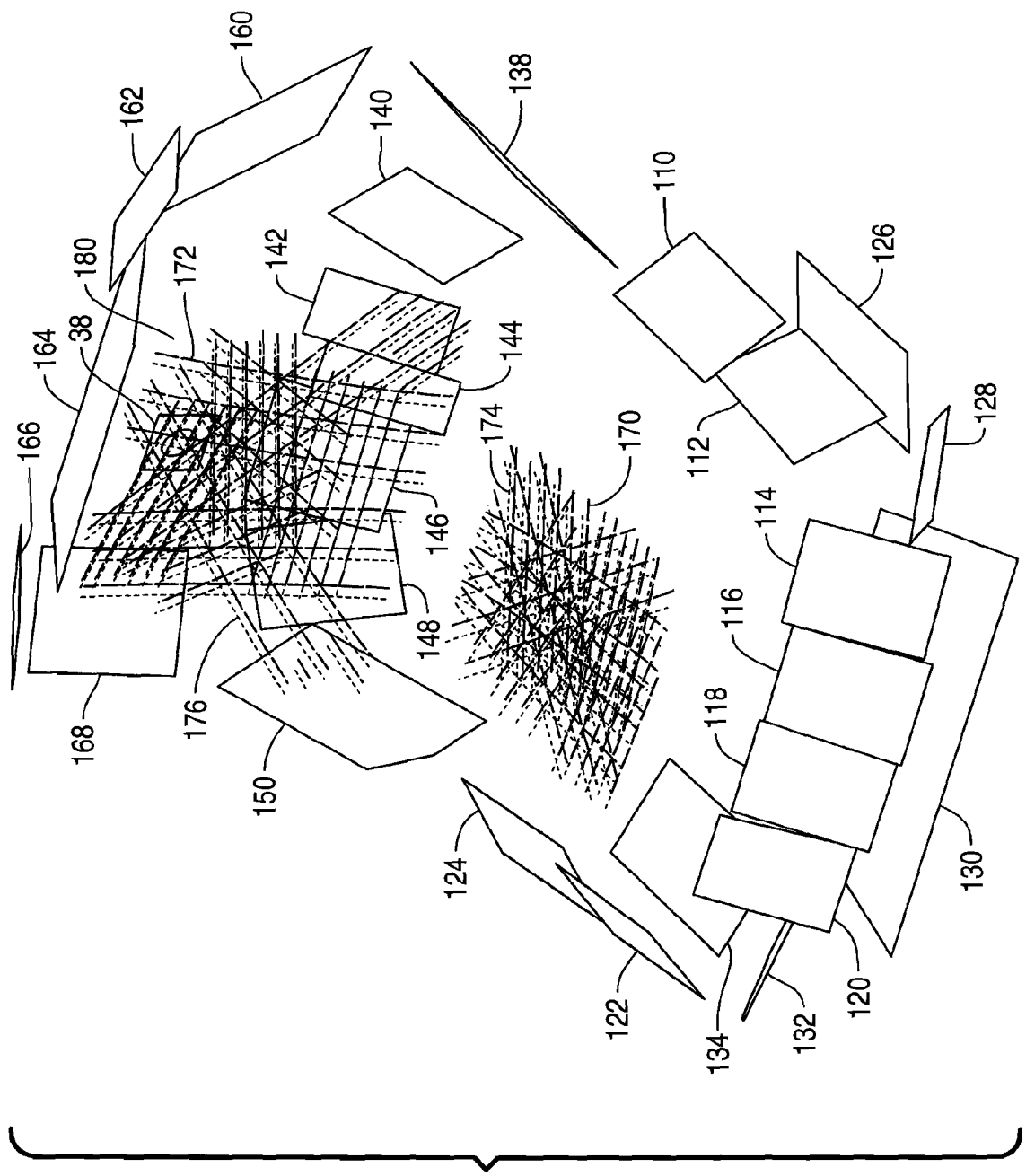
FIG. 9 illustrates mirrors and dual scan pattern.

With reference to FIGS. 8 and 9, pattern mirrors 18 are shown in more detail. In the descriptions below, positive "X" is toward the checker's right, positive "Y" is upward, and positive "Z" is toward the checker.

Pattern mirrors 18a include primary mirrors 110-124 and secondary pattern mirrors 126-134. Laser beams from lasers 12a are directed onto primary pattern mirrors 110-124 which further direct the laser beams to secondary pattern mirrors 126-134. Secondary pattern mirrors 126-134 further reflect the laser beams through first aperture 34, which is substantially horizontal, and into the scan zone.

Similarly, pattern mirrors 18b include primary mirrors 138-150 and secondary pattern mirrors 160-168. Laser beams from lasers 12b are directed onto primary pattern mirrors 138-150 which further direct the laser beams to secondary pattern mirrors 160-168. Secondary pattern mirrors 160-168 further reflect the laser beams through first aperture 36, which is substantially vertical, and into the scan zone.

The location of roof mirror 164, and absence of any secondary mirrors below it creates a large open space 180 between primary mirrors 138-150 and secondary mirrors 160-168. This facilitates mounting of imaging scanner 38 which receives images through aperture 36 in the open space in tower 61.

In a first embodiment, optical scanner 10 activates two lasers 12a, i.e., 12a1 and 12a2, and two lasers 12b, i.e., 12b1 and 12b2, to produce two patterns 172 and 176 from each of horizontal and vertical apertures 34 and 36. Patterns 172 and 176 are similar in appearance but the scan lines of patterns 172 and 176 are not aligned.

In a second embodiment, optical scanner 10 activates only one laser 12a and one laser 12b to produce one pattern from each of horizontal and vertical apertures 34 and 36.

The choice between single and dual pattern is basically a cost versus performance tradeoff. The dual pattern doubles the number of scan lines and allows for an extended zone for reading de-magnified labels. Optical scanner 10 may be built as one or the other.

In one example, the primary difference would be the absence or presence of additional lasers 12a, 12b and detectors 22a, 22b. As these are all part of scan engine 14, a field upgrade is envisioned as one way to add additional laser 12a, 12b and detectors 22a, 22b.

In another example, optical scanner 10 may be include four lasers 12a, 12b and four detectors 22a, 22b, but limit operation to single-pattern. Dual-pattern operation may be activated later following payment of an upgrade price by the owner of scanner 10. Methods of activating dual-pattern operation may include scanning a special programming barcode, flashing firmware in scanner 10 with new instructions or software, or remote activation based upon serial number permission in a remote activation database accessible to scanner 10 or a point-of-sale terminal connected to scanner 10.

Table I describes the various scan lines and their method of generation.

TABLE I

| Scan Line Set | Laser | Facet | Primary | Secondary | Aperture | Item Surfaces |
|---|---|---|---|---|---|---|
| Vertical Top Right | 12b1, 12b2 | 88, 84, 82 | 138 | 162 | 36 | +X, +Y, −Z |
| Vertical Right | 12b1, 12b2 | 88, 84, 82 | 138 | 160 | 36 | +X, −Z |
| Diagonal Right | 12b1, 12b2 | 88, 84, 82 | 140 | 164 | 36 | −Z |
| Horizontal Top Right | 12b1, 12b2 | 88, 80, 84, 90, 82, 86 | 142 | 164 | 36 | +Y, −Z |
| Horizontal Top Center | 12b1, 12b2 | 88, 80, 84, 90, 82, 86 | 144 | 164 | 36 | +Y, −Z |
| Horizontal Top Left | 12b1, 12b2 | 88, 80, 84, 90, 82, 86 | 146 | 164 | 36 | +Y, −Z |
| Diagonal Left | 12b1, 12b2 | 80, 90, 86 | 148 | 164 | 36 | −Z |
| Vertical Left | 12b1, 12b2 | 80, 90, 86 | 150 | 168 | 36 | −X, −Z |
| Vertical Top Left | 12b1, 12b2 | 80, 90, 86 | 150 | 166 | 36 | −X, +Y, −Z |
| Horizontal Left | 12a1, 12a2 | 88, 84, 82 | 124 | 134 | 34 | −X, −Y |
| Front Vertical Left | 12a1, 12a2 | 88, 84, 82 | 122 | 132 | 34 | −X, −Y, +Z |
| Horizontal Front Left | 12a1, 12a2 | 88, 80, 84, 90, 82, 86 | 120 | 130 | 34 | −Y, +Z |

TABLE I-continued

| Scan Line Set | Laser | Facet | Primary | Secondary | Aperture | Item Surfaces |
|---|---|---|---|---|---|---|
| Horizontal Front Center Left | 12a1, 12a2 | 88, 80, 84, 90, 82, 86 | 118 | 130 | 34 | −Y, +Z |
| Horizontal Front Center Right | 12a1, 12a2 | 88, 80, 84, 90, 82, 86 | 116 | 130 | 34 | −Y, +Z |
| Horizontal Front Right | 12a1, 12a2 | 88, 80, 84, 90, 82, 86 | 114 | 130 | 34 | −Y, +Z |
| Front Vertical Right | 12a1, 12a2 | 80, 90, 86 | 112 | 128 | 34 | +X, −Y, +Z |
| Horizontal Right | 12a1, 12a2 | 80, 90, 86 | 110 | 126 | 34 | +X, −Y |

Figure 10:
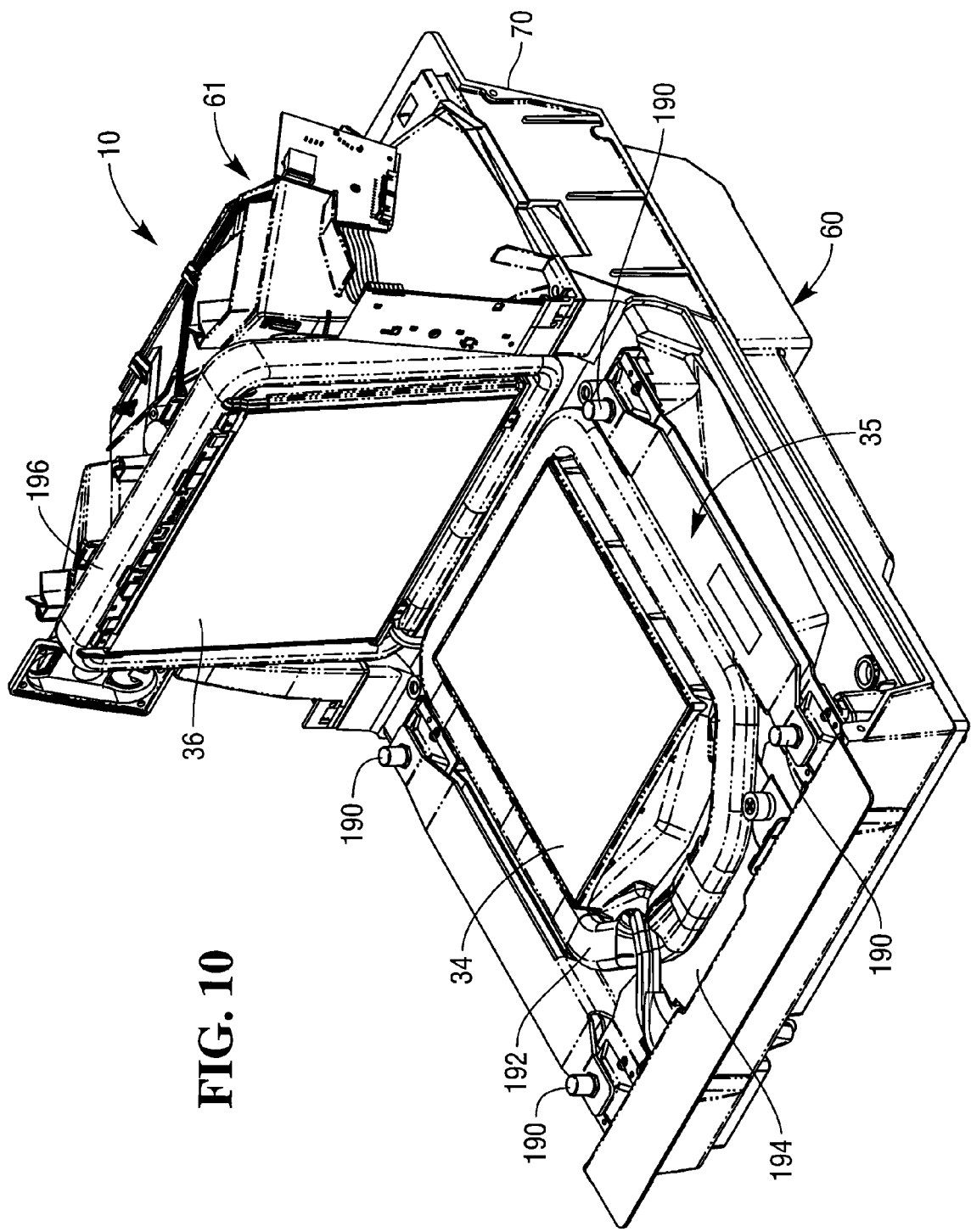
FIG. 10 is a perspective view of the scanner illustrating placement of an electronic article surveillance system.

With reference to FIG. 10, additional features of optical scanner 10 are illustrated. The base portion 60 of scanner 10 is about five inches in depth and includes planar beam scales 190, horizontal EAS coil 192, and pattern mirrors 18a. All electronics and scale components are located above mirror housing of pattern mirrors 18a. Scale 35 is a planar beam scale. EAS coil 192 has a coil cross section that is located inside and slightly above the neighboring primary horizontal mirror cross section (and primary front vertical mirror cross section). EAS coil 192 is positioned to take advantage of the fact that scanning beams coming from mirrored spinner 16 towards mirrors 114-120 are rising.

Vertical scan patterns 172 and 176 are created using a large-centrally located roof mirror 164 as the secondary mirror for primary mirrors 140-148 (vertical pickets and diagonal mirrors). This means that the lines projected onto the other vertical secondary mirrors 160 and 168 have a vertical orientation, and can be relatively thin. This facilitates mounting a vertical EAS coil 196 around vertical aperture 36.

RFID reader 39 may be mounted to the center top portion of vertical housing 61.

Although particular reference has been made to certain embodiments, variations and modifications are also envisioned within the spirit and scope of the following claims.

What is claimed is:

1. An optical scanner comprising:
   a substantially horizontal aperture and a substantially vertical aperture;
   an optics engine including
      first and third laser mounts each adapted to mount a laser so that the output beam of the laser is directable through the substantially horizontal aperture;
      second and forth laser mounts each adapted to mount a laser so that the output beam of the laser is directable through the substantially vertical aperture;
      first, second, third, and fourth detector mounts;
      a first laser in the first laser mount for producing a first scanning light beam;
      a second laser in the second laser mount for producing a second scanning light beam;
      a mirrored spinner;
      wherein the first and third laser mounts are located on a first side of the mirrored spinner and the second and fourth laser mounts are located on a second side of the mirrored spinner;
      a first collector between the first and third laser mounts and the mirrored spinner;
      a second collector between the second and fourth laser mounts and the mirrored spinner;
      a first detector in the first detector mount; and
      a second detector in the second detector mount;
   first pattern mirrors for receiving the first scanning light beam from the mirrored spinner, for directing the first scanning light beam through the substantially horizontal aperture to produce a first scan pattern, and for directing first light reflected from an item with a barcode label to the mirrored spinner;
   second pattern mirrors for receiving the second scanning light beam from the mirrored spinner, for directing the second scanning light beam through the substantially vertical aperture to produce a second scan pattern, and for directing second light reflected from the item to the mirrored spinner; and
   control circuitry for controlling operation of the first and second lasers and the mirrored spinner.

2. The scanner of claim 1, wherein the third and fourth laser mounts and the third and fourth detector mounts are empty but upgradeable to include third and fourth lasers and third and fourth detectors.

3. The scanner of claim 1, further comprising:
   a third laser in the third laser mount;
   a fourth laser in the fourth laser mount;
   a third detector in the third detector mount; and
   a fourth detector in the fourth detector mount;
   wherein the third and fourth lasers produce third and fourth scanning light beams;
   wherein the first pattern mirrors are also for receiving the third scanning light beam from the mirrored spinner, for directing the third scanning light beam through the substantially horizontal aperture to produce a third scan pattern, and for directing third light reflected from the item to the mirrored spinner;
   wherein the second pattern mirrors are also for receiving the fourth scanning light beam from the mirrored spinner, for directing the fourth scanning light beam through the substantially vertical aperture to produce a fourth scan pattern, and for directing fourth light reflected from the item to the mirrored spinner; and
   wherein the control circuitry is also for controlling operation of the third and fourth lasers.

4. The scanner of claim 3, wherein the third and fourth lasers are inactive until activated.

5. The scanner of claim 3, wherein the control circuitry receives an activation command from a programming barcode label.

6. The scanner of claim 3, wherein the control circuitry receives an activation command from a computer.

7. The scanner of claim 3, wherein the control circuitry includes updatable programming which if updated activates the third and fourth lasers.

8. The scanner of claim 3, wherein the first and third scan patterns are similar but not aligned, and wherein the second and fourth scan patterns are similar but not aligned.

* * * * *